US011939705B2

(12) United States Patent
Sun et al.

(10) Patent No.: US 11,939,705 B2
(45) Date of Patent: Mar. 26, 2024

(54) BAMBOO SHADE FABRIC

(71) Applicant: Shandong YUMA Sun-shading Technology Corp., Ltd., Shandong (CN)

(72) Inventors: Chengzhi Sun, Shandong (CN); Guixian Cui, Shandong (CN); Kun Zheng, Shandong (CN); Jinhuang Liang, Shandong (CN)

(73) Assignee: Shandong YUMA Sun-shading Technology Corp., Ltd., Shandong (CN)

( * ) Notice: Subject to any disclaimer, the term of this patent is extended or adjusted under 35 U.S.C. 154(b) by 112 days.

(21) Appl. No.: 17/589,874

(22) Filed: Jan. 31, 2022

(65) Prior Publication Data

US 2022/0251738 A1 Aug. 11, 2022

(30) Foreign Application Priority Data

Feb. 9, 2021 (CN) ......................... 202120355941.2

(51) Int. Cl.

| | |
|---|---|
| ***D03D 1/00*** | (2006.01) |
| ***D03D 15/217*** | (2021.01) |
| ***D03D 15/283*** | (2021.01) |
| ***D03D 15/292*** | (2021.01) |
| ***D03D 15/37*** | (2021.01) |
| ***E06B 9/24*** | (2006.01) |

(52) U.S. Cl.

CPC ......... *D03D 1/0017* (2013.01); *D03D 15/217* (2021.01); *D03D 15/283* (2021.01); *D03D 15/292* (2021.01); *D03D 15/37* (2021.01); *E06B 9/24* (2013.01); *D10B 2503/03* (2013.01)

(58) Field of Classification Search

None

See application file for complete search history.

(56) References Cited

U.S. PATENT DOCUMENTS

2018/0363172 A1* 12/2018 Keating .................. D04B 1/16

* cited by examiner

*Primary Examiner* — Shawn Mckinnon

(74) *Attorney, Agent, or Firm* — Jen-Feng Lee, Esq.

(57) ABSTRACT

Present invention teaches a bamboo fabric shade that is woven in a weft and warp fashion from a plurality of bamboo filaments. An alternative embodiment of dual bamboo filaments as a single unit for the weaving is done in a similar fashion. Each bamboo filament has a high molecular mass bamboo thread inside a layer of coating wherein the coating is made to be thicker at a middle node section with the thickness tapering off towards the two distal ends of the high molecular mass bamboo thread. The coating uses PVC material, with optional addition of UV-absorbent materials. Such construction of the bamboo fabric adds to the reduction of light pollution when used for home decoration purposes.

10 Claims, 5 Drawing Sheets

BAMBOO SHADE FABRIC

PRIORITY CLAIM

Present invention claimed the priority of a Chinese patent application by the same inventor, filed on Feb. 9, 2021, having application number 202120355941.2.

FIELD AND BACKGROUND OF THE INVENTION

Present invention disclosed and claimed a bamboo shade fabric for use in home decoration.

Commercially available shades and fabrics are made from industrial and/or composite materials with uniform thickness, oftentimes with reflective surfaces. In terms of serving the function of blocking out direct sun light, the commercial shades and fabrics achieve the minimal purpose.

Due to the nature of such construction, such uniform thickness feature, with reflective attribute, created a dull visual impression to the consumers. And because of such construction, some degree of light pollution can be expected due to the uniform thickness and the reflectiveness attributes.

The simple solutions adopted commercially by most is to print certain graphic patterns or design images on the surface, to enhance the visual attractiveness, as well as to reduce the reflection and the light pollution. However, such imprinting of graphic designs is no longer desired by consumers whose aesthetic appetites have changed over time.

The present invention provides a solution that's sort of outside the box thinking: a completely different material that remove the uniform thickness feature.

SUMMARY OF THE INVENTION

The bamboo shade fabric of present invention is primarily composed of a plurality of bamboo filaments woven horizontally and vertically.

The filament is not of uniform thickness. The middle portion, consisting of the node of a bamboo segment, is thicker due to the application of the coating layer; the thickness tapers off towards the two distal ends. Such uneven thickness filament creates a sense of visual attractiveness not available from the commonly available industrial products.

The filament is composed of a high molecular mass single bamboo thread inside a layer of coating and is made to be thicker at a middle node section, with the thickness tapering off towards two distal points of the high molecular mass single bamboo thread. The layer of coating will add to the physical and mechanical strength of the filament. The coating can choose to use PVC material; other suitable materials can also be used.

The node section has a preferred diameter of between 0.3 mm and 5 mm, and the high molecular mass single bamboo thread has a preferred diameter of between 0.15 mm and 2.0 mm. The layer of coating 4 is made to be between 0.1 mm and 3 mm. The length of the middle node section is made to be between 10 mm and 1,000 mm.

Preferably, the distance between two filaments, when woven together, is between 0 mm and 5.0 mm. Additionally, glue can be applied to the junction points of the horizontal and vertical filaments when woven together.

The layer of coating can optionally add UV-absorbent materials, Because the bamboo filament is made to be of uneven thickness, with the node section being thicker and tapering off to the two distal ends, the aesthetic sense of the fabric would look dramatically different from today's commercial shades. The uneven thickness adds to the reduction of light reflecting of the surface of the fabric and, consequently, reduction of light pollution as desired by consumers.

In another embodiment of present invention, 2 bamboo filaments 1 are put together as a single unit and are woven in a weft and warp fashion. All other design attributes for this 2-filament version are the same as the single filament version.

DESCRIPTION OF THE DRAWINGS

The accompanying drawings exemplify the preferred embodiments of the invention. Together with the description, serve to explain the principles of the invention.

A brief description of the drawings is as follows.

DETAILED DESCRIPTION OF THE PREFERRED EMBODIMENT

Figure 1:
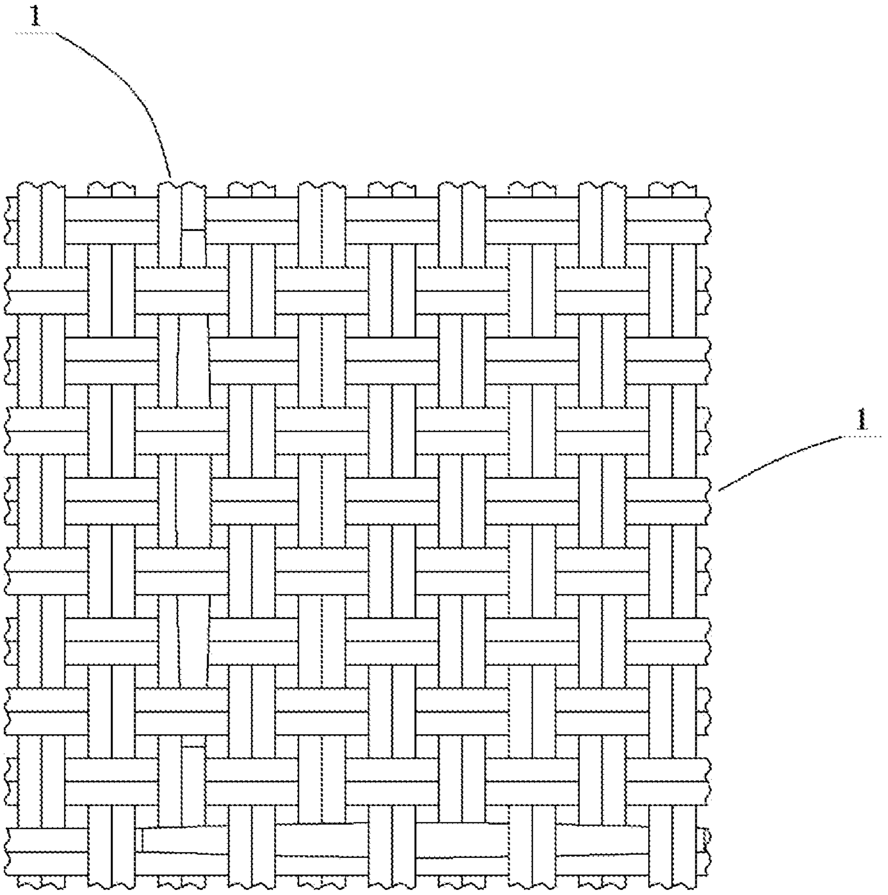
FIG. 1 shows the weaving pattern of the bamboo filaments in a weft and warp fashion, using the 2-filament version as an example.
Figure 2:
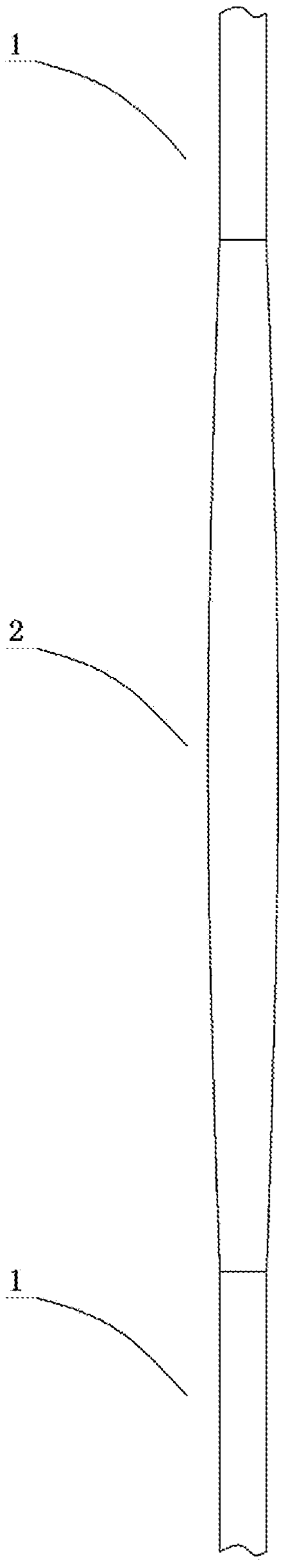
FIG. 2 shows a single filament with a thicker node section in the middle portion.
Figure 3:
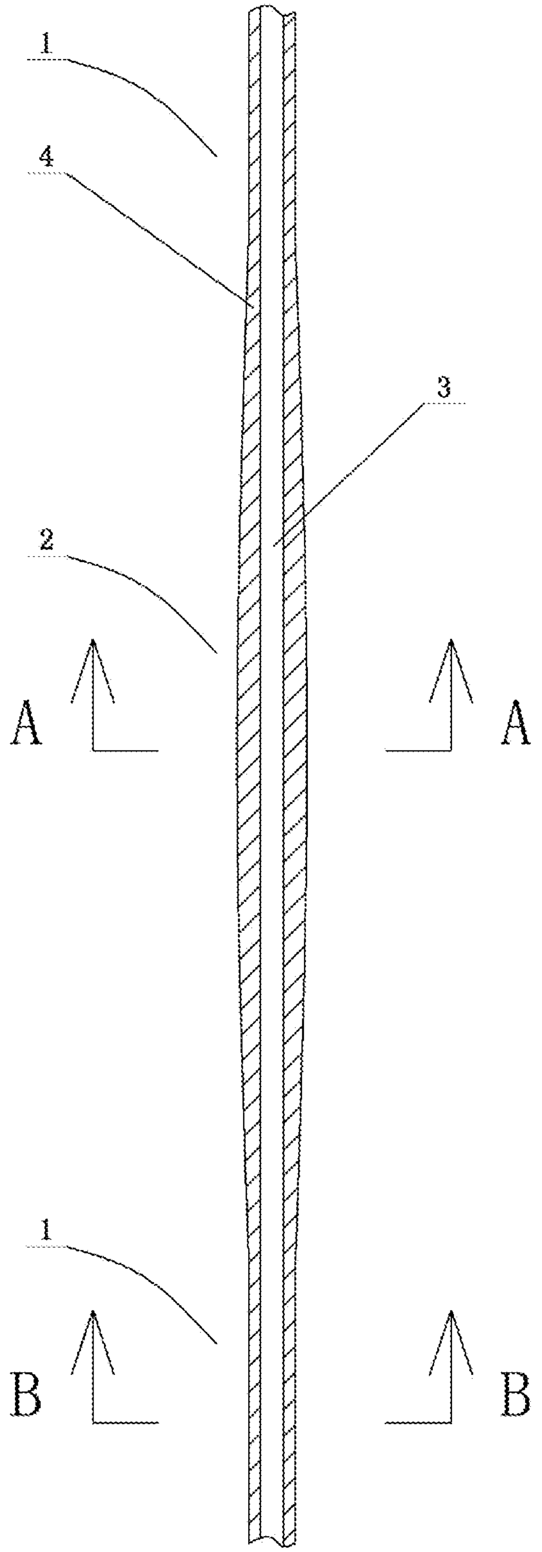
FIG. 3 shows the profile view of the construction of a single filament, with middle portion cut-line shown as A-A and distal end cut-line shown as B-B.
Figure 4:
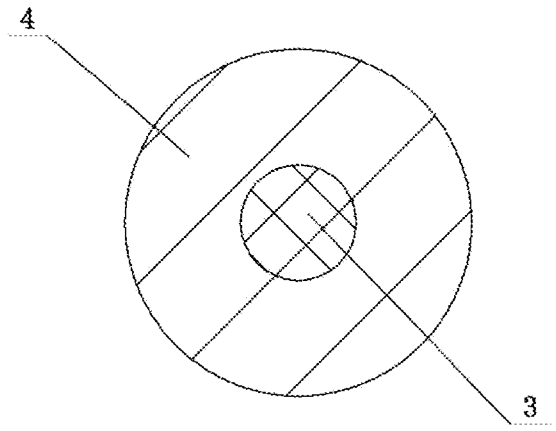
FIG. 4 is the profile view per the A-A cut-line, showing thicker coating layer.
Figure 5:
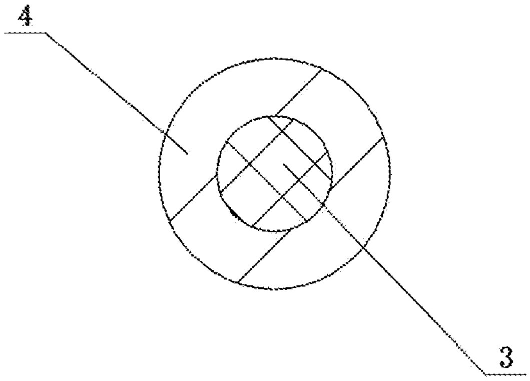
FIG. 5 is the profile view per the B-B cut-line, showing thinner coating layer.

The bamboo shade fabric of present invention is primarily composed of a plurality of bamboo filaments 1 woven in a weft and warp fashion, i.e. having vertical and horizontal filaments woven together. FIG. 1 shows the weaving in a weft and warp fashion, but is more aptly for the second embodiment of two filaments as a unit, discussed later. No new figure is needed as FIG. 1 is more than sufficient to enable the practice of said weft and warp weaving.

Each of the filament 1 is composed of a high molecular mass single bamboo thread 3 inside a layer of coating 4 wherein the layer of coating 4 and is made to be thicker at a node section 2 at the middle portion of the filament 1, with the thickness tapering off towards two distal points of the high molecular mass single bamboo thread 3. The layer of coating 4 will add to the physical and/or mechanical strength of filament 1, and thus the bamboo fabric overall.

The node section 2 has a preferred diameter of between 0.3 mm and 5 mm, and the high molecular mass single bamboo thread 3 has a preferred diameter of between 0.15 mm and 2.0 mm.

Additionally, the layer of coating 4 uses PVC material. The layer of coating 4 can optionally add UV-absorbent materials. Commercially available UV-absorbent materials can be used. Such materials include, but not limited to, benzotriazole, benzophenone, etc., that can be used on different types of PVC or plastics products.

With or without the UV-absorbent materials, the layer of coating 4 is made to be between 0.1 mm and 3 mm.

The length of the middle node section 2 is made to be between 10 mm and 1,000 mm. Additionally, glue can be applied to the junction points of the horizontal and vertical filaments when woven together.

In another embodiment of present invention, two filaments 1 are put together as a single unit, so that a plurality of such dual-filament units are woven in a weft and warp fashion, as shown in FIG. 1.

The construction is the same as the first embodiment where each of the filament 1 is composed of a high molecular mass single bamboo thread 3 inside a layer of coating 4 wherein the layer of coating 4 is made to be thicker at a middle node section 2, with the thickness tapering off towards two distal points of the high molecular mass single bamboo thread 3.

The layer of coating uses the PVC materials as already described.

The addition of UV-absorbent materials, as introduced in the first embodiment, applies equally to the 2-filament embodiment.

The same construction for the thickness of the layer of coating 4 is the same: be between 0.1 mm and 0.3 mm. The same construction for the length of the middle node section 2 is the same: between 10 mm and 1,000 mm.

The invention of the bamboo fabric shade, as disclosed herein, will aid in the reduction of light pollution for home decoration purposes.

Applicant noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A bamboo shade fabric, comprising:

a plurality of dual filaments woven as a unit together and woven in a weft and warp fashion wherein each of the filament is composed of a high molecular mass single bamboo thread inside a layer of coating wherein the layer of coating is made to be thicker at a middle node section of the filament in a lengthwise direction, with the filament's thickness tapering off towards two distal ends of the high molecular mass single bamboo thread.

2. The bamboo shade fabric of claim 1, wherein the node section has a preferred diameter of between 0.3 mm and 5 mm, and the high molecular mass single bamboo thread has a diameter of between 0.15 mm and 2.0 mm.

3. The bamboo shade fabric of claim 1, wherein the layer of coating uses PVC material.

4. The bamboo shade fabric of claim 1, wherein the layer of coating adds UV-absorbent materials.

5. The bamboo shade fabric of claim 1, wherein the thickness of the layer of coating is made to be between 0.1 mm and 3 mm.

6. The bamboo shade fabric of claim 1, wherein the length of the middle node section is made to be between 10 mm and 1,000 mm.

7. The bamboo shade fabric of claim 6, wherein the node section has a preferred diameter of between 0.3 mm and 5 mm, and the high molecular mass single bamboo thread has a diameter of between 0.15 mm and 2.0 mm.

8. The bamboo shade fabric of claim 6, wherein the layer of coating uses PVC material.

9. The bamboo shade fabric of claim 6, wherein the layer of coating adds UV-absorbent materials.

10. The bamboo shade fabric of claim 6, wherein the thickness of the layer of coating is made to be between 0.1 mm and 3 mm.

* * * * *